(12) United States Patent
Ashley et al.

(10) Patent No.: US 9,654,513 B1
(45) Date of Patent: May 16, 2017

(54) AUTOMATED NETWORK SECURITY POLICY DEPLOYMENT IN A DYNAMIC ENVIRONMENT

(71) Applicant: International Business Machines Corporation, Armonk, NY (US)

(72) Inventors: Paul A. Ashley, Queensland (AU); Cheng-Ta Lee, Taipei (TW); Ronald B. Williams, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/953,761

(22) Filed: Nov. 30, 2015

(51) Int. Cl.
*H04L 29/06* (2006.01)
*H04L 12/825* (2013.01)

(52) U.S. Cl.
CPC .............. *H04L 63/20* (2013.01); *H04L 47/25* (2013.01)

(58) Field of Classification Search
CPC ... H04L 63/20; H04L 47/25; H04L 29/06578; H04L 29/06986; H04L 63/0227; H04L 63/0254; G06F 21/10
USPC .......................................................... 726/1
See application file for complete search history.

(56) References Cited

U.S. PATENT DOCUMENTS

| 2007/0043860 | A1* | 2/2007 | Pabari | G06F 9/5072 709/224 |
| 2013/0332983 | A1 | 12/2013 | Koorevaar et al. | |
| 2014/0317684 | A1* | 10/2014 | Porras | H04L 63/20 726/1 |
| 2014/0359697 | A1* | 12/2014 | Ji | H04L 63/0263 726/1 |

* cited by examiner

*Primary Examiner* — William Goodchild
(74) *Attorney, Agent, or Firm* — Terrile, Cannatti, Chambers & Holland, LLP; Stephen A. Terrile

(57) ABSTRACT

A method, system and computer-usable medium are disclosed for automatically deploying a network security policy based on virtual network topology in a dynamic software defined network (SDN) comprising: providing a flow control interface in a dynamic SDN wherein the flow control interface receives virtual network topology, operational endpoints, and policy to apply to the operational endpoints; responsive to receiving an SDN change indication, identifying changes to enforcement points for an SDN change corresponding to the SDN change indication; and, providing enforcement points affected by the SDN change with a policy reflecting the SDN change.

17 Claims, 11 Drawing Sheets

AUTOMATED NETWORK SECURITY POLICY DEPLOYMENT IN A DYNAMIC ENVIRONMENT

BACKGROUND OF THE INVENTION

Field of the Invention

The present invention relates in general to the field of computers and similar technologies, and in particular to software utilized in this field. Still more particularly, it relates to a method, system and computer-usable medium for automated network security policy deployment in a dynamic environment.

Description of the Related Art

In many known networking environments having physical switches and servers, the security policy for any particular network security control element (e.g. firewalls, intrusion prevention) often remains relatively static. Because the network and applications remain relatively static and the policy depends on the network configuration and application workload, the changes to the security policy occur relatively infrequently. This allows security administrators to customize security policy for each security control element. For example, referring to FIG. 1, labeled Prior Art, certain known firewall (FW) policy intrusion prevention system (IPS) policies depend on the particular network and application configuration. The policy of a particular IPS (IPS 3) associated with a particular subnet may have a user based policy when that particular subnet has users accessing servers on that subnet and then out to the Internet. However, another subnet IPS (IPS 2) does not require a user based policy because this subnet is only inspecting traffic between servers. Finally, another subnet IPS (IPS 1) has a policy suitable to an Internet gateway location, and may include policies around users, applications, and IP reputation. Referring to FIG. 2, labeled Prior Art, shows an example of a network environment where the applications are executing within virtual machines in a hypervisor (e.g. an ESX hypervisor, a kernel based virtual machine (KVM) hypervisor, an XenServer hypervisor, etc.). With this network environment, a subnet IPS (IPS 2) executes as a virtual appliance (hypervisor guest). In this environment, the location of the virtual machine (VM) is dynamic. To support load balancing, a VM can be moved from one host to another. Because of the dynamic nature of the environment, the task of enforcing network security policy for all VMs can be more difficult. One known method of enforcing a network security policy is to have the same security policy enforced for every VM in every subnet. For example, a known IPS deployment in a virtual environment can require each IPS entity to load the same security policy, so when the VM is moved from one host to another host, or one subnet to another, the same security policy is enforced on the migrated VM.

Referring to FIG. 3, labeled Prior Art, an example enterprise or public cloud based environment is shown using technology such as an OpenStack cloud computing platform or a CloudStack cloud computing platform and Software Defined Networking (SDN) principles to provide a SDN network environment. SDN principles separate a network topology from the physical network infrastructure and add an abstraction layer in between the network topology and the network infrastructure to define the network topology by software. Using SDN principles and virtualization, the entire network topology may be constructed using virtual network objects, including virtual switches, virtual routers, virtual network segments, etc. Moreover, the network overlay technology provided with SDN principles separates the physical boundary between traditional data centers, e.g., two servers in different data centers may be located in the same virtual network segment.

With such an environment it can be challenging to enforce intrusion prevention system policies. With such a cloud based environment, network topology can change frequently when compared to a traditional data center. New virtual network are often dynamically added to the environment. With known intrusion prevention system policies, more and more scenarios are added to the security policy even though not all of the scenarios will apply to every VM, creating a relatively large policy for every VM. The large policies lead to more memory consumption on the IPS and also introduce more computational overhead when processing network traffic. Additionally the policy can become confusing for security administrators. Not only can the VMs be moved in a SDN network environment but also the entire network topology can be changed in real time, thus creating an extra-dynamic network environment. The extra-dynamic nature of SDN exposes all the assets, including physical assets and virtual assets to a rapidly changing network environment, which can make designing a comprehensive security policy challenging. It is thus desirable to provide a security solution to allow effective network security policy management in a highly dynamic environment, such as posed by a SDN network environment.

SUMMARY OF THE INVENTION

A method, system and computer-usable medium are disclosed for automatically deploying a network security policy based on virtual network topology in a dynamic software defined network (SDN) comprising: providing a flow control interface in a dynamic SDN wherein the flow control interface receives virtual network topology, operational endpoints, and policy to apply to the operational endpoints; responsive to receiving an SDN change indication, identifying changes to enforcement points for an SDN change corresponding to the SDN change indication; and, providing enforcement points affected by the SDN change with a policy reflecting the SDN change.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Figure 1:
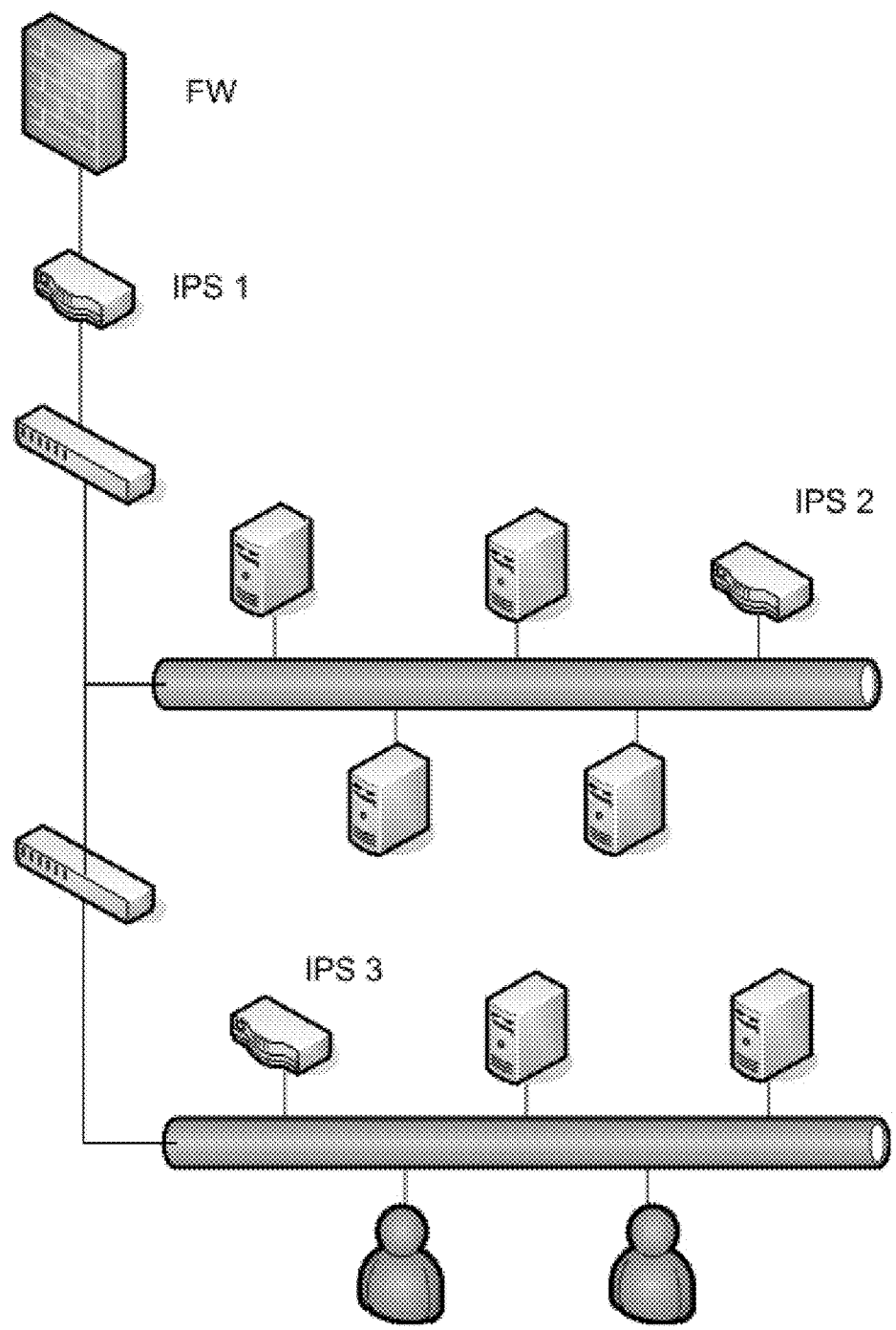
FIG. 1, labeled Prior Art, shows a block diagram of an example network flow environment FIG. 2, labeled Prior Art, shows a block diagram of another example of a network environment.
Figure 2:
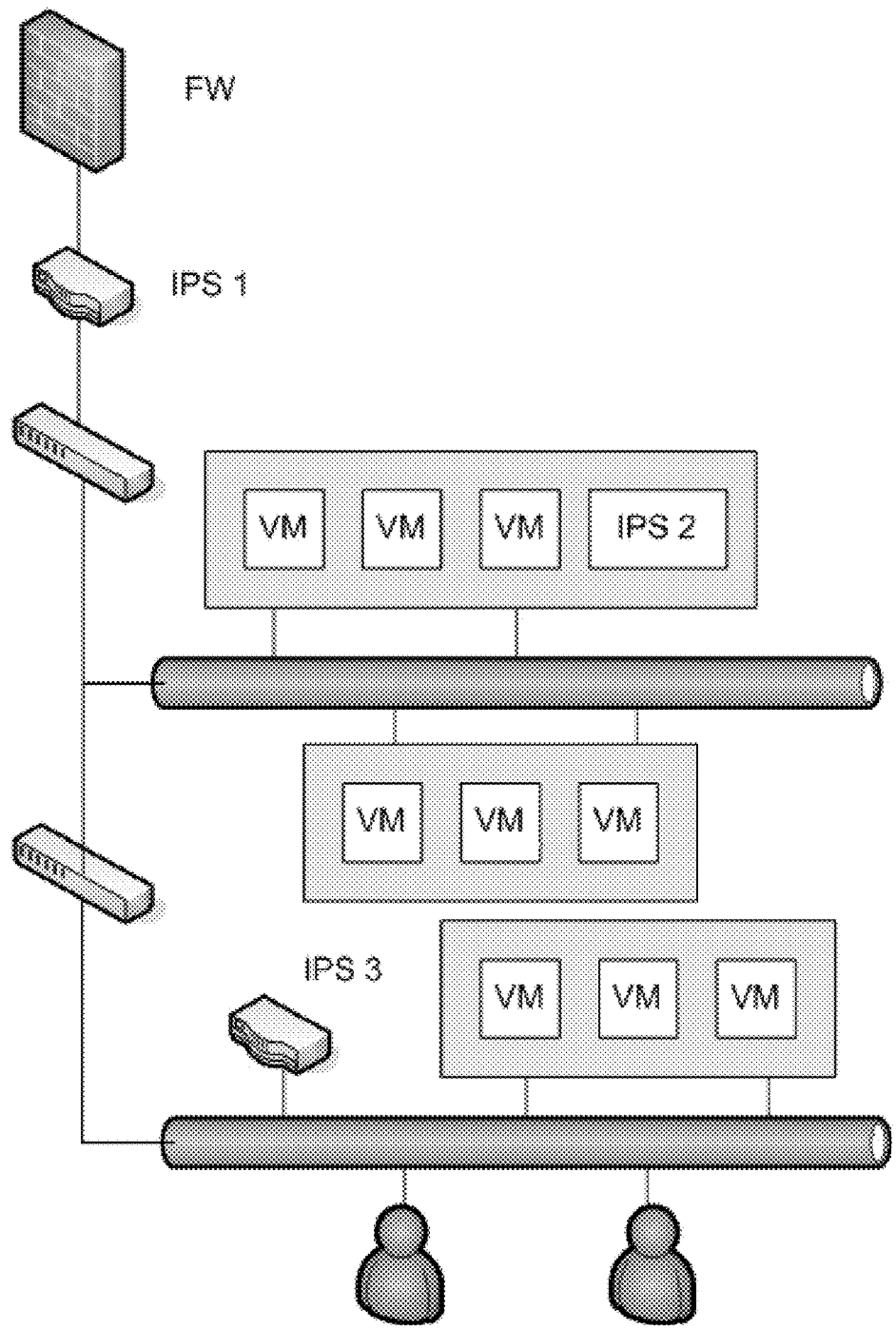
Figure 3:
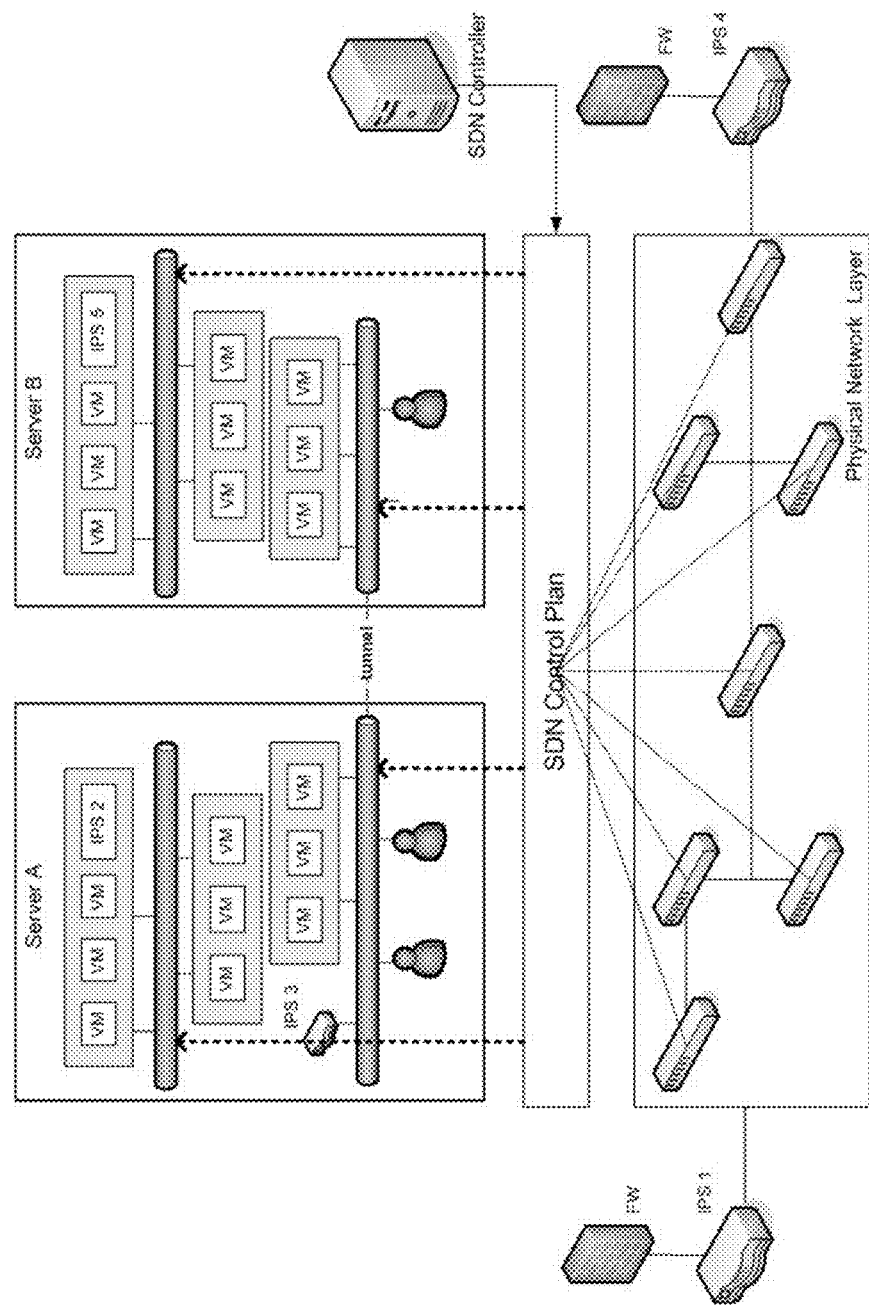
FIG. 3, labeled Prior Art, shows a block diagram of another example of a network environment.

A method, system and computer-usable medium are disclosed for performing a network flow security operation. In various embodiments, the network flow security operation is performed via a network flow controller. The network flow controller is based on a virtual network topology and flow information to initiate a process of loading and deploying policies on a policy enforcement point. In various embodiments, the network flow security operation further includes utilization of a mechanism in a policy enforcement point to dynamically load policies based on command and data sent from the network flow controller based on dynamic topology.

Because the network flow controller has knowledge of any networks associated with the controller, had knowledge of any endpoints operationally coupled to the networks and has knowledge of the policy that is appropriate to each endpoint, the network flow controller can apply policies in a dynamic environment that is optimal for the network configuration. In various embodiments, the network flow controller notifies enforcement points of the policy that is appropriate for any newly added endpoint or environment, directs traffic to the enforcement points after validating that an appropriate policy has been loaded and notifies enforcement points when a policy is no longer needed when an endpoint is moved or removed (i.e., destroyed).

As will be appreciated by one skilled in the art, the present invention may be embodied as a method, system, or computer program product. Accordingly, embodiments of the invention may be implemented entirely in hardware, entirely in software (including firmware, resident software, microcode, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Figure 4:
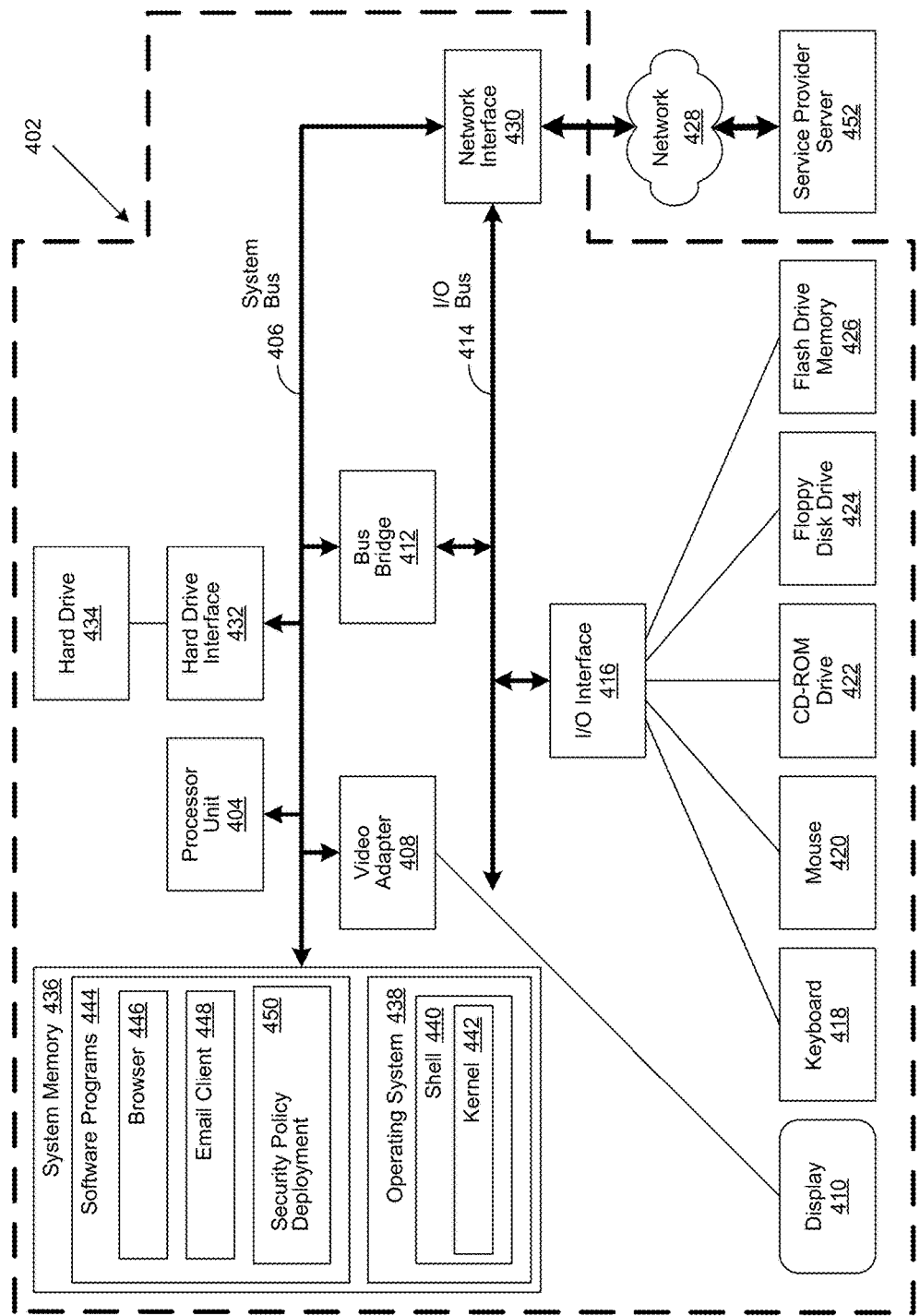
FIG. 4 shows an exemplary client computer in which the present invention may be implemented.

FIG. 4 is a block diagram of an exemplary client computer 402 in which the present invention may be utilized. Client computer 402 includes a processor unit 404 that is coupled to a system bus 406. A video adapter 408, which controls a display 410, is also coupled to system bus 406. System bus 406 is coupled via a bus bridge 412 to an Input/Output (I/O) bus 414. An I/O interface 416 is coupled to I/O bus 414. The I/O interface 416 affords communication with various I/O devices, including a keyboard 418, a mouse 420, a Compact Disk-Read Only Memory (CD-ROM) drive 422, a floppy disk drive 424, and a flash drive memory 426. The format of the ports connected to I/O interface 416 may be any known to those skilled in the art of computer architecture, including but not limited to Universal Serial Bus (USB) ports.

Client computer 402 is able to communicate with a service provider server 452 via a network 428 using a network interface 430, which is coupled to system bus 406. Network 428 may be an external network such as the Internet, or an internal network such as an Ethernet Network or a Virtual Private Network (VPN). Using network 428, client computer 402 is able to use the present invention to access service provider server 452.

A hard drive interface 432 is also coupled to system bus 406. Hard drive interface 432 interfaces with a hard drive 434. In a preferred embodiment, hard drive 434 populates a system memory 436, which is also coupled to system bus 406. Data that populates system memory 436 includes the client computer's 402 operating system (OS) 438 and software programs 444.

OS 438 includes a shell 440 for providing transparent user access to resources such as software programs 444. Generally, shell 440 is a program that provides an interpreter and an interface between the user and the operating system. More specifically, shell 440 executes commands that are entered into a command line user interface or from a file. Thus, shell 440 (as it is called in UNIX®), also called a command processor in Windows®, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 442) for processing. While shell 440 generally is a text-based, line-oriented user interface, the present invention can also support other user interface modes, such as graphical, voice, gestural, etc.

As depicted, OS 438 also includes kernel 442, which includes lower levels of functionality for OS 438, including essential services required by other parts of OS 438 and software programs 444, including memory management, process and task management, disk management, and mouse and keyboard management. Software programs 444 may include a browser 446 and email client 448. Browser 446 includes program modules and instructions enabling a World Wide Web (WWW) client (i.e., client computer 402) to send and receive network messages to the Internet using HyperText Transfer Protocol (HTTP) messaging, thus enabling communication with service provider server 452. In various embodiments, software programs 444 may also include a network security policy deployment system 450. In these and other embodiments, the network security policy deployment system 450 includes code for implementing the processes described hereinbelow. In one embodiment, client computer 402 is able to download the network security policy deployment system 450 from a service provider server 452.

The hardware elements depicted in client computer 402 are not intended to be exhaustive, but rather are representative to highlight components used by the present invention. For instance, client computer 402 may include alternate memory storage devices such as magnetic cassettes, Digital Versatile Disks (DVDs), Bernoulli cartridges, and the like. These and other variations are intended to be within the spirit, scope and intent of the present invention.

Figure 5:
FIG. 5 shows a block diagram of an example network environment.
Figure 5:
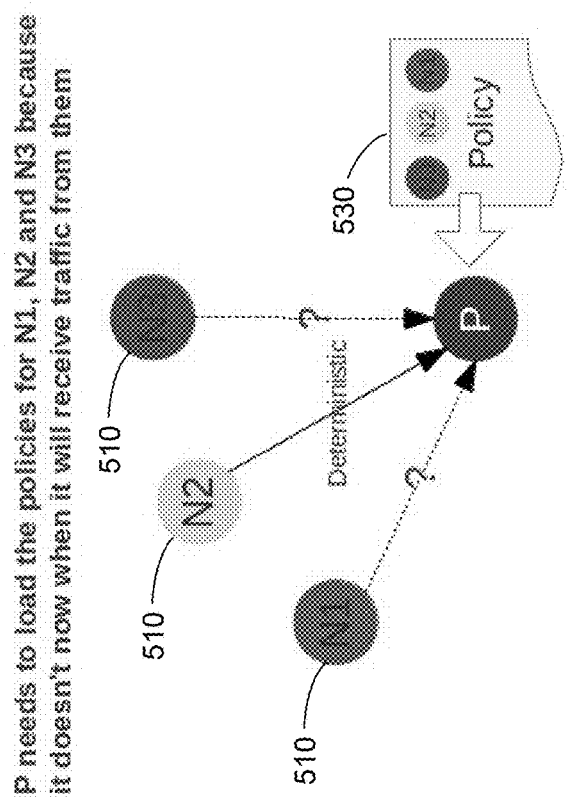

Referring to FIG. 5, a block diagram of an example network environment 500 is shown. More specifically, the example network environment 500 includes three network nodes 510 (N1, N2, N3) as well as a policy enforcement point 520 (P). A network policy 530 is provided to the policy enforcement point 520. The policy enforcement point in the network environment 500 loads the full policies for each network node from the network policy. The full policies are loaded for a plurality of reasons. More specifically, because the enforcement point 520 has no knowledge to the network topology, therefore, the enforcement point 520 cannot foresee upcoming network traffic from the network nodes N1, N2 and N3. Additionally, it is often not practical to perform the checking per each packet to whether the enforcement point 520 should load new policies based upon the packet.

Figure 6:
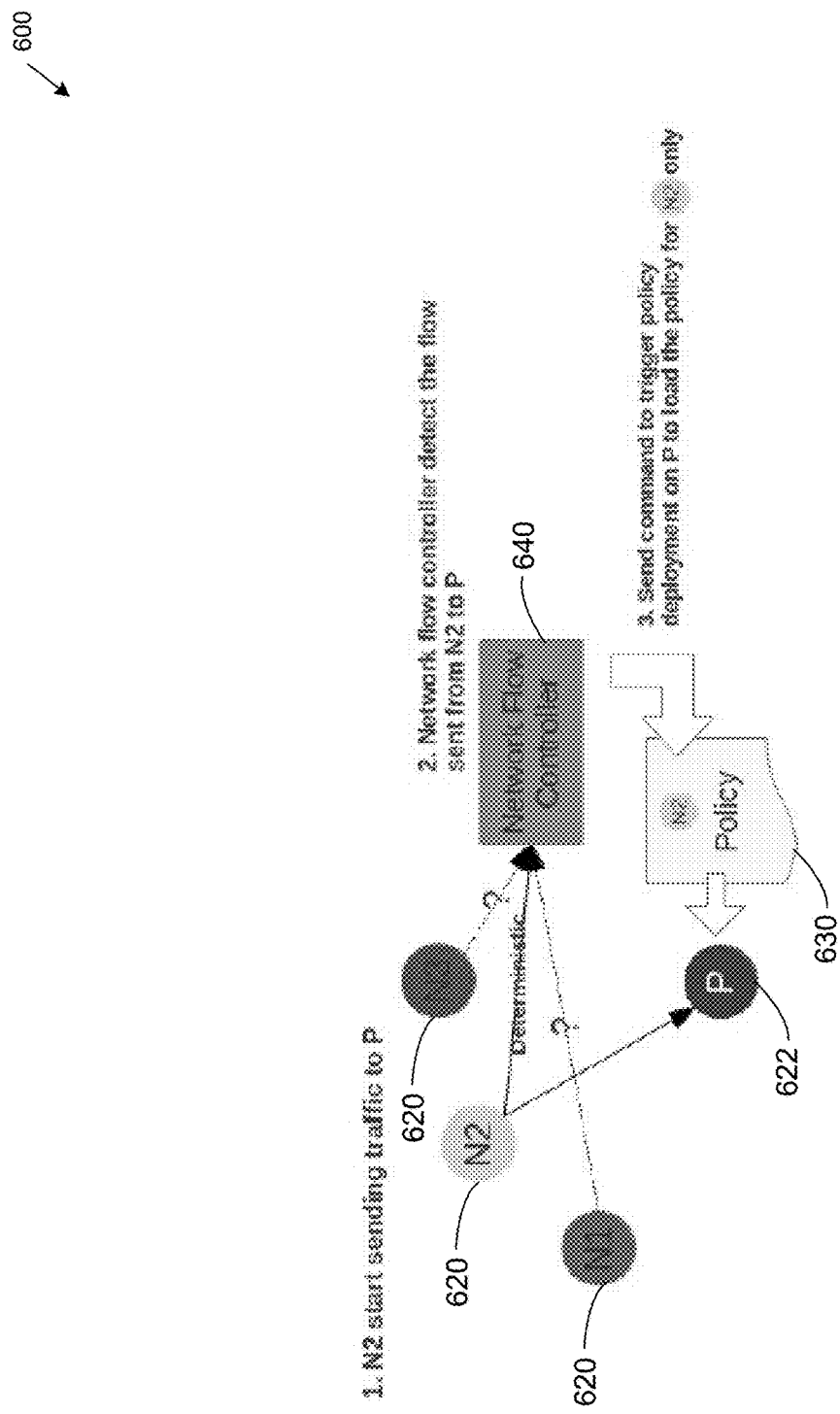
FIGS. 6 and 7 show block diagram of an example an SDN network environment
Figure 7:
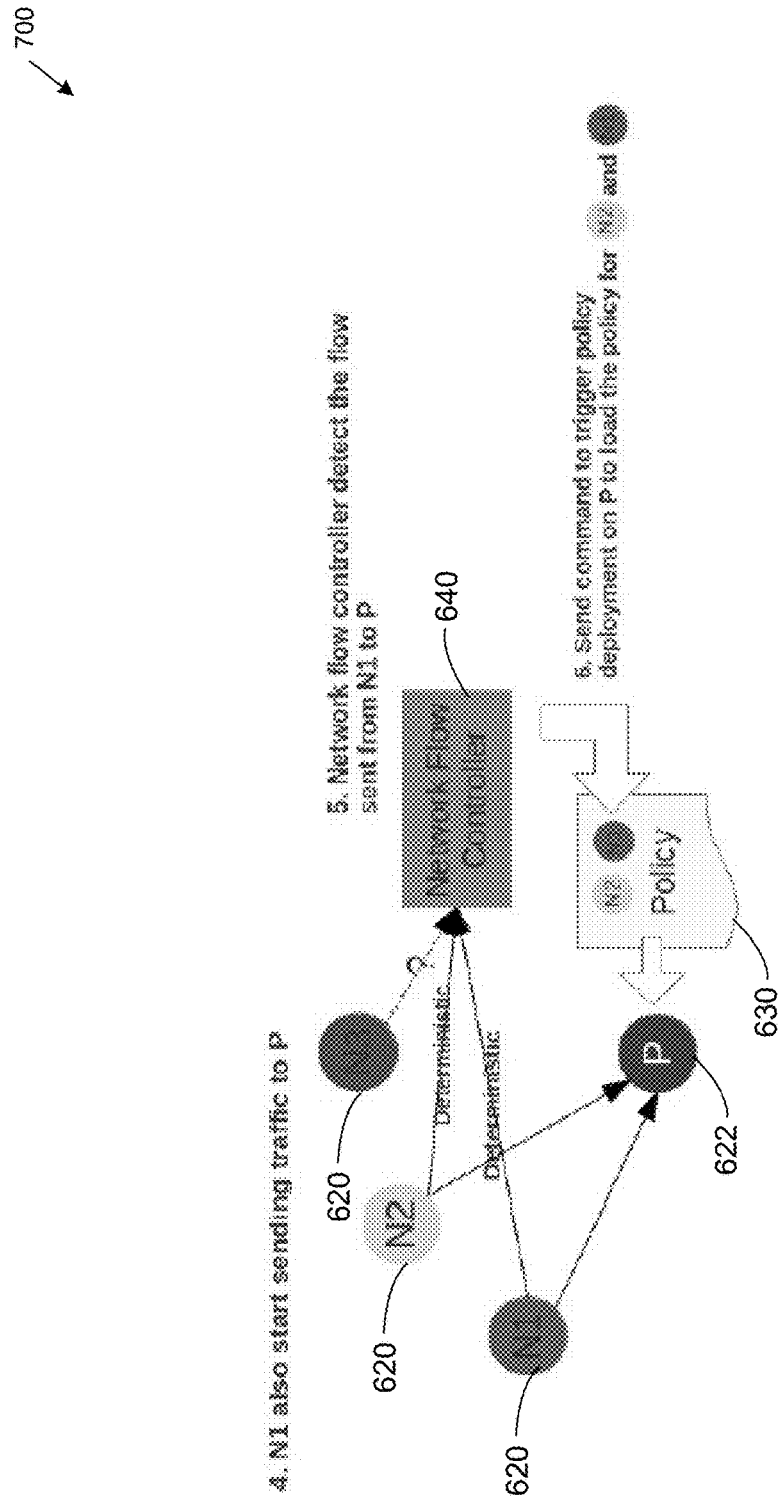

Referring to FIGS. 6 and 7, block diagram of an example an SDN network environment 600 is shown. More specifically, the example network environment includes three network nodes 620 (N1, N2, N3), a policy enforcement point 622 (P), a network policy 630 and a network flow controller 640.

The policy enforcement point 620 in the SDN network environment 600 leverages the network flow controller 640 to deploy policies 630. Each enforcement point 620 therefore has knowledge regarding what is an optimal set of policies to load in each time frame. Specifically, the network flow controller 640 is notified about the new network flows, so the network flow controller 640 can deterministically know the upcoming traffic that will flow to each enforcement point 620. Additionally, the network flow controller 640 then has the capability to notify each enforcement point 620 before the new network traffic flows to the enforcement point 620. Accordingly, the enforcement point 620 can base on the instructions sent from the network flow controller 640 to manage the policies 630 that are provided to the enforcement point 620.

Figure 8:
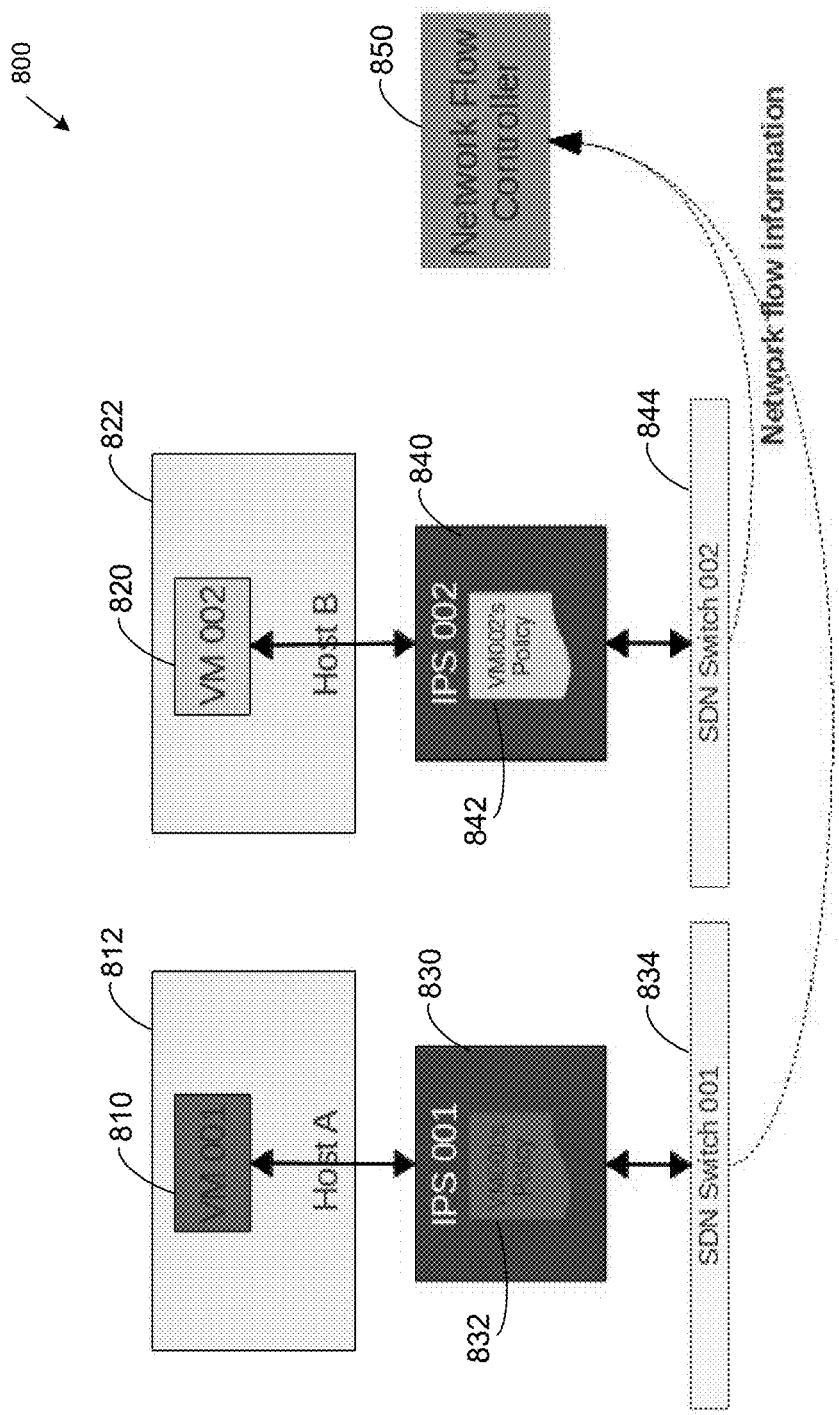
FIGS. 8 and 9 show block diagrams of an SDN network environment during a VM migration between hosts.
Figure 9:
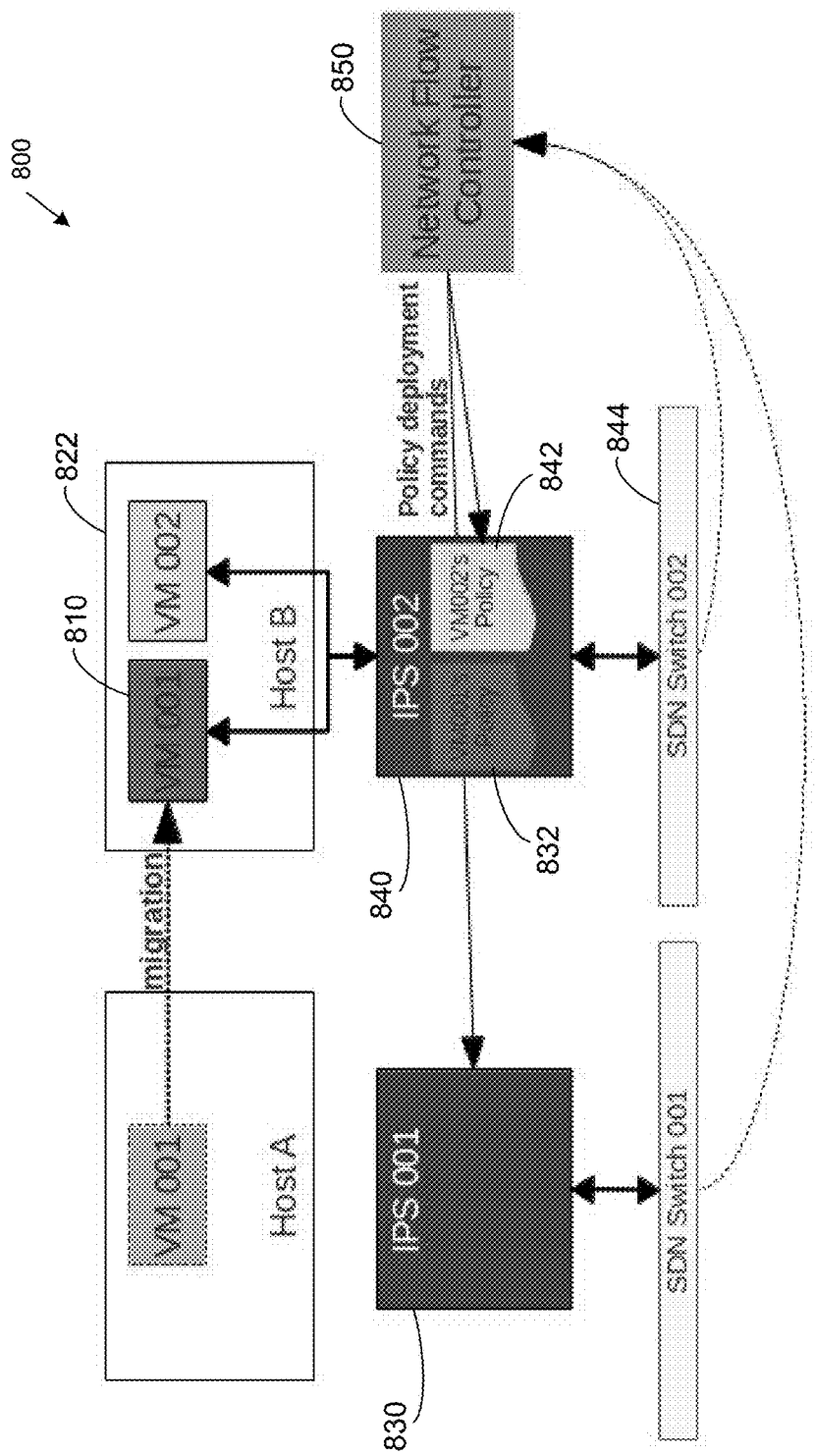

Referring to FIGS. 8 and 9, block diagrams of an SDN network environment 800 during a VM migration between hosts is shown. More specifically referring to FIG. 8, a first virtual machine 810 (VM 001) is executing on a first host 812 (host A) and a second virtual machine 820 (VM 002) is executing on a second host 822 (host B). A first intrusion prevention system 830 (i.e., an enforcement point) which includes a policy 832 (VM001's Policy) for the first virtual machine 810 is positioned between the first virtual machine and a first SDN switch 834 (SDN Switch 001). A second intrusion prevention system 840 which includes a policy 842 (VM002's Policy) for the second virtual machine 822 is positioned between the second virtual machine and a second SDN switch 844 (SDN Switch 002). A network flow controller 850 manages the SDN switches and receives network flow information from the SDN switches managed by it. It will be appreciated that either or both the first virtual machine 810 and the second virtual machine 820 may include a plurality of virtual machines.

When operating in the configuration shown in FIG. 8, the first intrusion prevention system 830 only needs to protect the virtual machines 810 executing on Host A and the second intrusion prevention system only needs to protect the virtual machines 820 executing on Host B. Accordingly, the first intrusion prevention system 830 only needs to load the policy for the first virtual machine 810 and the second intrusion prevention system 840 only needs to load the policy for the second virtual machine.

Referring again to FIG. 9, after a VM migration where in this example the first virtual machine 810 VM 001 migrates to Host B, the network flow sent to the first virtual machine is provided via SDN switch 002 after migration. The SDN switch 002 determines that this is the first time it has provided network flow to the first virtual machine. Accordingly, the SDN switch 002 provides a notification to the network flow controller regarding this determination. Using this information, the network flow controller now determines that the intrusion prevention system IPS 002 now needs to protect the virtual machines VM 001 and VM 002. Thus, the network flow controller 850 causes the intrusion prevention system IPS 002 to load policies for the first virtual machine 810 and the second virtual machine 820 via policy deployment commands. Additionally, the network flow controller 850 also sends a command to the first intrusion prevention system 830 to cause it to unload the policy of the first virtual machine as this virtual machine is no longer receiving network flow via the first SDN switch.

Figure 10:
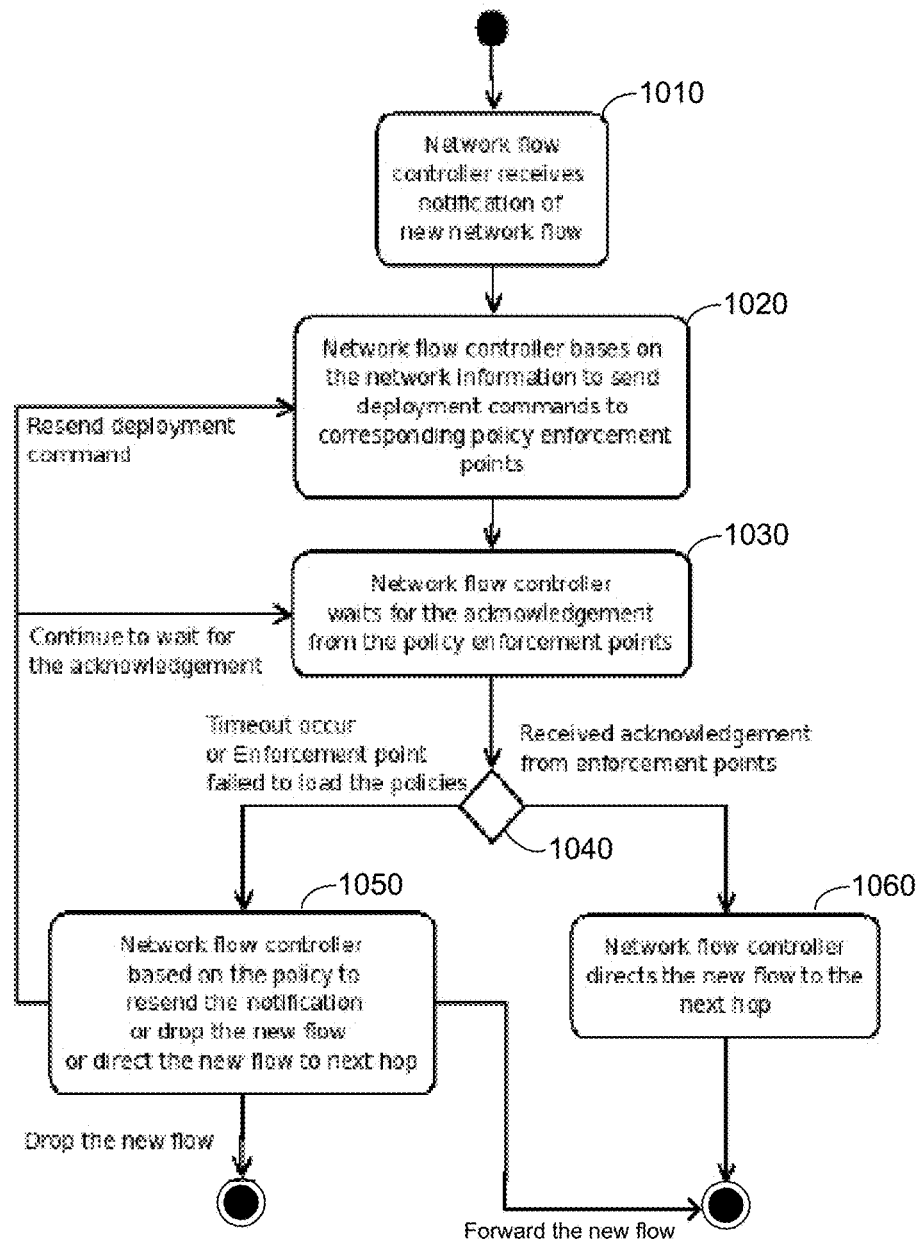
FIG. 10 shows a flow chart of the operation of a network flow controller.

Referring to FIG. 10, a flow chart of the operation 1000 of a network flow controller is shown. More specifically, the operation begins at step 1010 with the network flow controller receiving a notification that a new network flow has been detected within the network environment. Next at step 1020, the network flow controller, based on the new network flow information, sends deployment commands to policy enforcement points affected by the new network flow. Next at step 1030, the network flow controller waits for an acknowledgement form the affected policy enforcement points. Next, at step 1040, if the network flow controller determines that a timeout occurs and/or an enforcement point fails to load the appropriate policies, the then operation proceeds to step 1050. If at step 1040, the network flow controller receives an acknowledgement from the enforcement points, then the operation proceeds to step 1060.

At step 1050, the network flow controller performs one of a plurality of operations based upon the policy. More specifically, the network flow controller can resend the notification to the affected endpoints. The network flow controller can also remove the new network flow from the policy enforcement operation. The network flow controller can also direct the new network flow to a future hop (i.e., to a next processor in a series of processors). More specifically, when controlling network flow via an SDN, the SDN has a concept of a series of processors through which the network flow are directed. The flow is a virtual flow as direct connection between the series of processors is not required. The SDN causes the serialization of a flow through non-direct connected processors, creating a virtual network topology possibly unrelated to the physical network topology. When resending the notification, the operation returns to step 1020. When continuing to wait for an acknowledgement, the operation returns to step 1030. When removing the new network flow from the policy enforcement operation, the operation 1000 completes. At step 1060, the network flow controller directs the new flow to the next hop.

Figure 11:
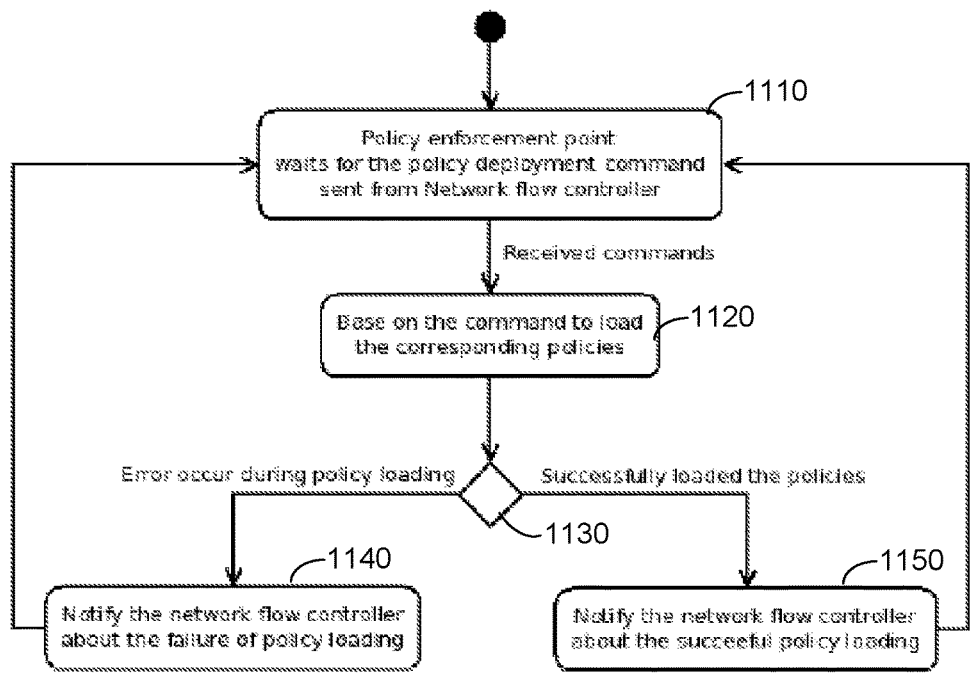
FIG. 11 shows a flow chart of the operation of loading policies on an enforcement point.

Referring to FIG. 11, a flow chart of the operation 1100 of loading policies on an enforcement point is shown. More specifically, the operating begins at step 1110 with the policy enforcement point awaiting a policy deployment command which is provided by the network flow controller. Next, at step 1120, when the commands are received the policy enforcement points loads the corresponding policies based on the command. Next, at step 1130, the enforcement point determines whether an error occurred during policy loading or the policies were successfully loaded. If an error occurred, then the operation proceeds to step 1140 where the enforcement point notifies the network flow controller about the failure of policy loading. If the policies were successfully loaded, then the operation proceeds to step 1150 where the enforcement point notifies the network flow controller about the successful policy loading. After either step 1140 or 1150, the operation returns to step 1110 to await further communication from the network flow controller.

Although the present invention has been described in detail, it should be understood that various changes, substitutions and alterations can be made hereto without departing from the spirit and scope of the invention as defined by the appended claims.

What is claimed is:

1. A computer-implemented method for automatically deploying a network security policy based on virtual network topology in a dynamic software defined network (SDN) comprising:
    providing a flow control interface in the dynamic SDN, the dynamic SDN separating a network topology from a physical network infrastructure, the flow control interface having knowledge of networks associated with the controller endpoints coupled to the networks and a policy appropriate for each endpoint, the flow control interface receiving a virtual network topology, operational endpoints, and a policy to apply to the operational endpoints;
    responsive to receiving an SDN change indication, identifying changes to enforcement points for an SDN change corresponding to the SDN change indication, each enforcement point having an associated network node, each enforcement point having knowledge regarding an optimal set of policies to load, the flow control interface deterministically knowing upcoming traffic that will flow to each enforcement point by being notified of new network flows;
    providing enforcement points affected by the SDN change with a policy reflecting the SDN change;
    downloading dynamically policy changes to enforcement points;
    monitoring for at least one of an acknowledgement and a time out of the policy changes; and
    performing an action based on the monitoring.

2. The method of claim 1, further comprising:
    responsive to detecting a time out, performing an action selected from a group consisting of resending a notification, dropping a new flow, and rerouting the network flow.

3. The method of claim 1, further comprising:
    responsive to detecting the acknowledgement, directing network flow traffic based on the SDN change.

4. The method of claim 1, wherein:
    the SDN change comprises moving a virtual machine from a first host to a second host; and,
    the policy reflecting the SDN change comprises providing an enforcement point associated with the second host with a policy corresponding to the virtual machine.

5. The method of claim 4, wherein:
    the policy reflecting the SDN change comprises removing a policy corresponding to the virtual machine from an enforcement point associated with the second host.

6. A system comprising:
    a processor;
    a data bus coupled to the processor; and
    a computer-usable medium embodying computer program code, the computer-usable medium being coupled to the data bus, the computer program code used for automatically deploying a network security policy based on virtual network topology in a dynamic software defined network (SDN) and comprising instructions executable by the processor and configured for:
        providing a flow control interface in the dynamic SDN, the dynamic SDN separating a network topology from a physical network infrastructure, the flow control interface having knowledge of networks associated with the controller endpoints coupled to the networks and a policy appropriate for each endpoint, the flow control interface receiving a virtual network topology, operational endpoints, and a policy to apply to the operational endpoints;
        responsive to receiving an SDN change indication, identifying changes to enforcement points for an SDN change corresponding to the SDN change indication, each enforcement point having an associated network node, each enforcement point having knowledge regarding an optimal set of policies to load, the flow control interface deterministically knowing upcoming traffic that will flow to each enforcement point by being notified of new network flows;

providing enforcement points affected by the SDN change with a policy reflecting the SDN change;

downloading dynamically policy changes to enforcement points;

monitoring for at least one of an acknowledgement and a time out of the policy changes; and performing an action based on the monitoring.

7. The system of claim 6, wherein the instructions are further configured for:

responsive to detecting a time out, performing an action selected from a group consisting of resending a notification, dropping a new flow, and rerouting the network flow.

8. The system of claim 6, wherein the instructions are further configured for:

responsive to detecting the acknowledgement, directing network flow traffic based on the SDN change.

9. The system of claim 6, wherein:

the SDN change comprises moving a virtual machine from a first host to a second host; and, the policy reflecting the SDN change comprises providing an enforcement point associated with the second host with a policy corresponding to the virtual machine.

10. The system of claim 9, wherein:

the policy reflecting the SDN change comprises removing a policy corresponding to the virtual machine from an enforcement point associated with the second host.

11. A non-transitory, computer-readable storage medium embodying computer program code, the computer program code comprising computer executable instructions configured for:

providing a flow control interface in the dynamic SDN, the dynamic SDN separating a network topology from a physical network infrastructure, the flow control interface having knowledge of networks associated with the controller endpoints coupled to the networks and a policy appropriate for each endpoint, the flow control interface receiving a virtual network topology, operational endpoints, and a policy to apply to the operational endpoints;

responsive to receiving an SDN change indication, identifying changes to enforcement points for an SDN change corresponding to the SDN change indication, each enforcement point having an associated network node, each enforcement point having knowledge regarding an optimal set of policies to load, the flow control interface deterministically knowing upcoming traffic that will flow to each enforcement point by being notified of new network flows;

providing enforcement points affected by the SDN change with a policy reflecting the SDN change;

downloading dynamically policy changes to enforcement points;

monitoring for at least one of an acknowledgement and a time out of the policy changes; and performing an action based on the monitoring.

12. The non-transitory, computer-readable storage medium of claim 11, wherein the computer executable instructions are further configured for:

responsive to detecting a time out, performing an action selected from a group consisting of resending a notification, dropping a new flow, and rerouting the network flow.

13. The non-transitory, computer-readable storage medium of claim 11, wherein the computer executable instructions are further configured for:

responsive to detecting the acknowledgement, directing network flow traffic based on the SDN change.

14. The non-transitory, computer-readable storage medium of claim 11, wherein:

the SDN change comprises moving a virtual machine from a first host to a second host; and, the policy reflecting the SDN change comprises providing an enforcement point associated with the second host with a policy corresponding to the virtual machine.

15. The non-transitory, computer-readable storage medium of claim 14, wherein:

the policy reflecting the SDN change comprises removing a policy corresponding to the virtual machine from an enforcement point associated with the second host.

16. The non-transitory, computer-readable storage medium of claim 11, wherein the computer executable instructions are deployable to a client system from a server system at a remote location.

17. The non-transitory, computer-readable storage medium of claim 11, wherein the computer executable instructions are provided by a service provider to a user on an on-demand basis.

* * * * *